June 26, 1928.

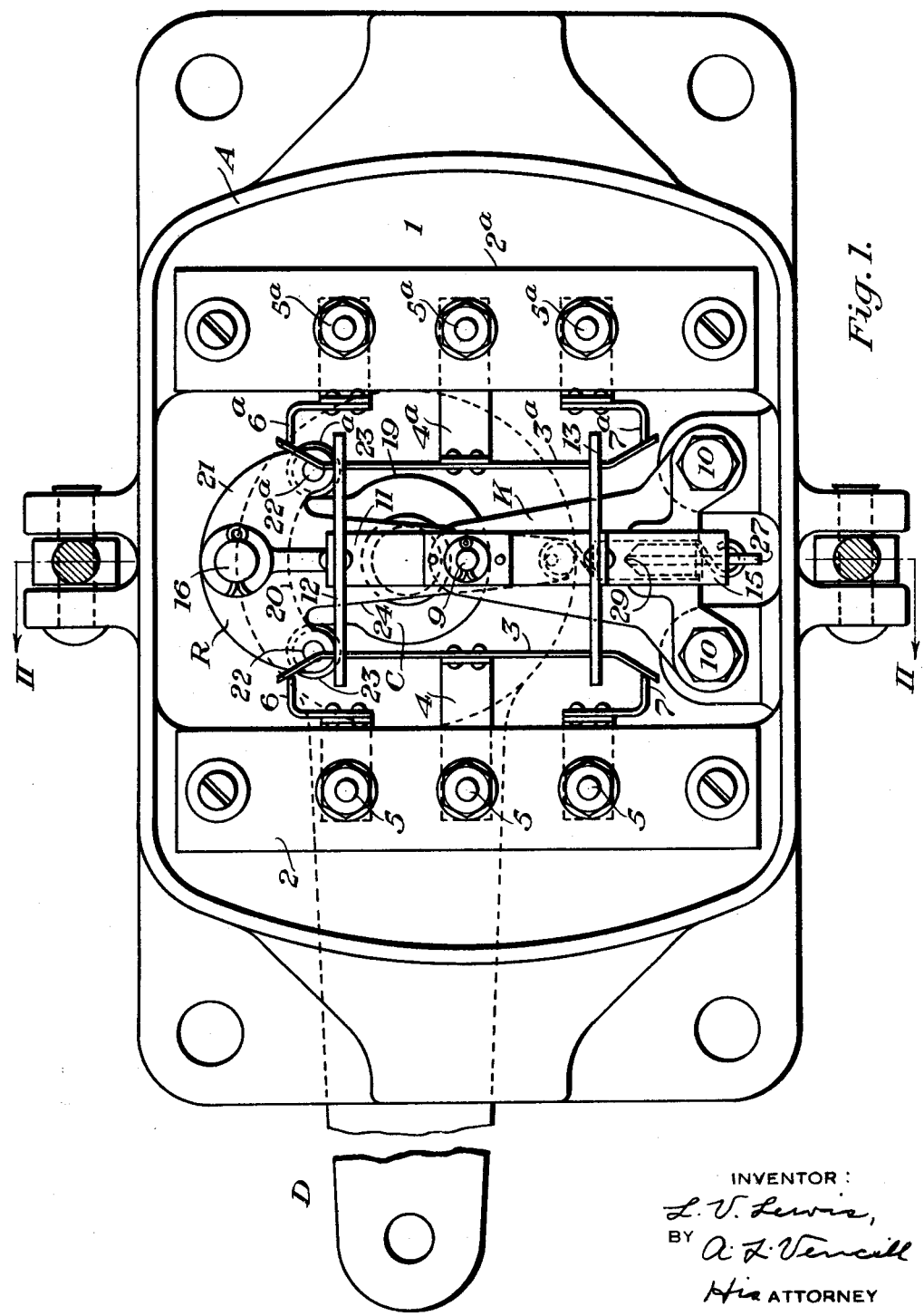

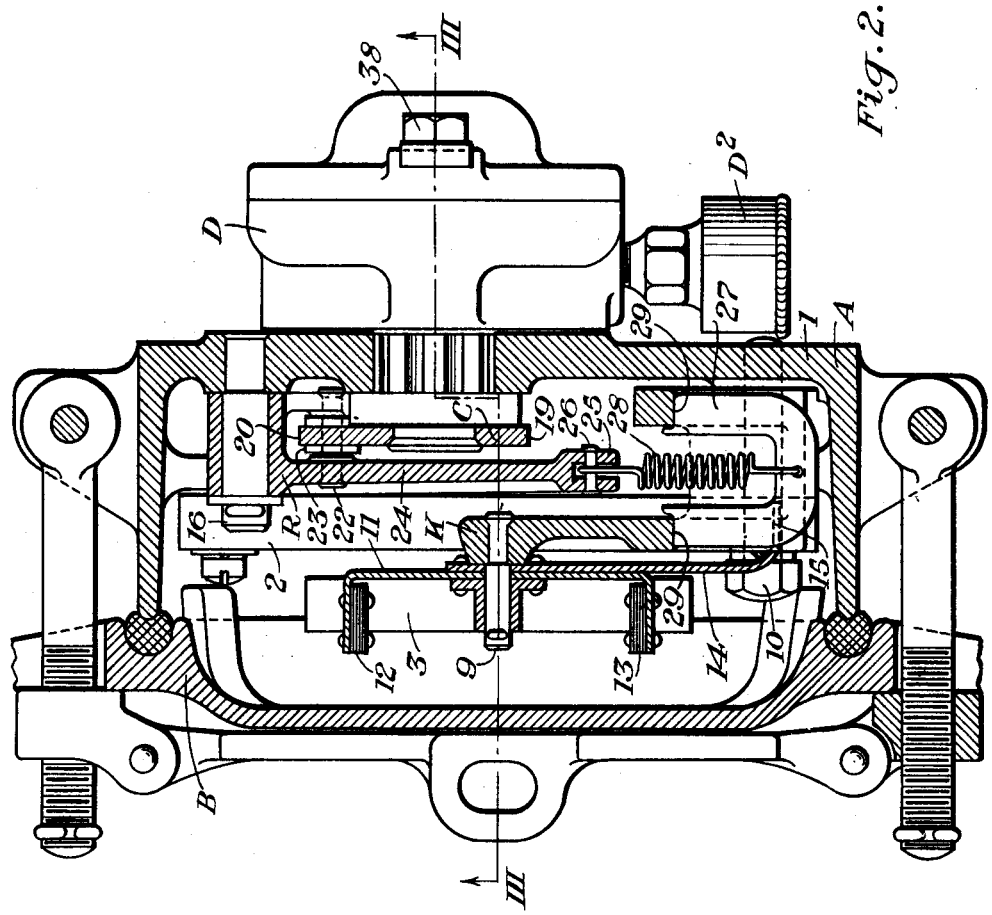

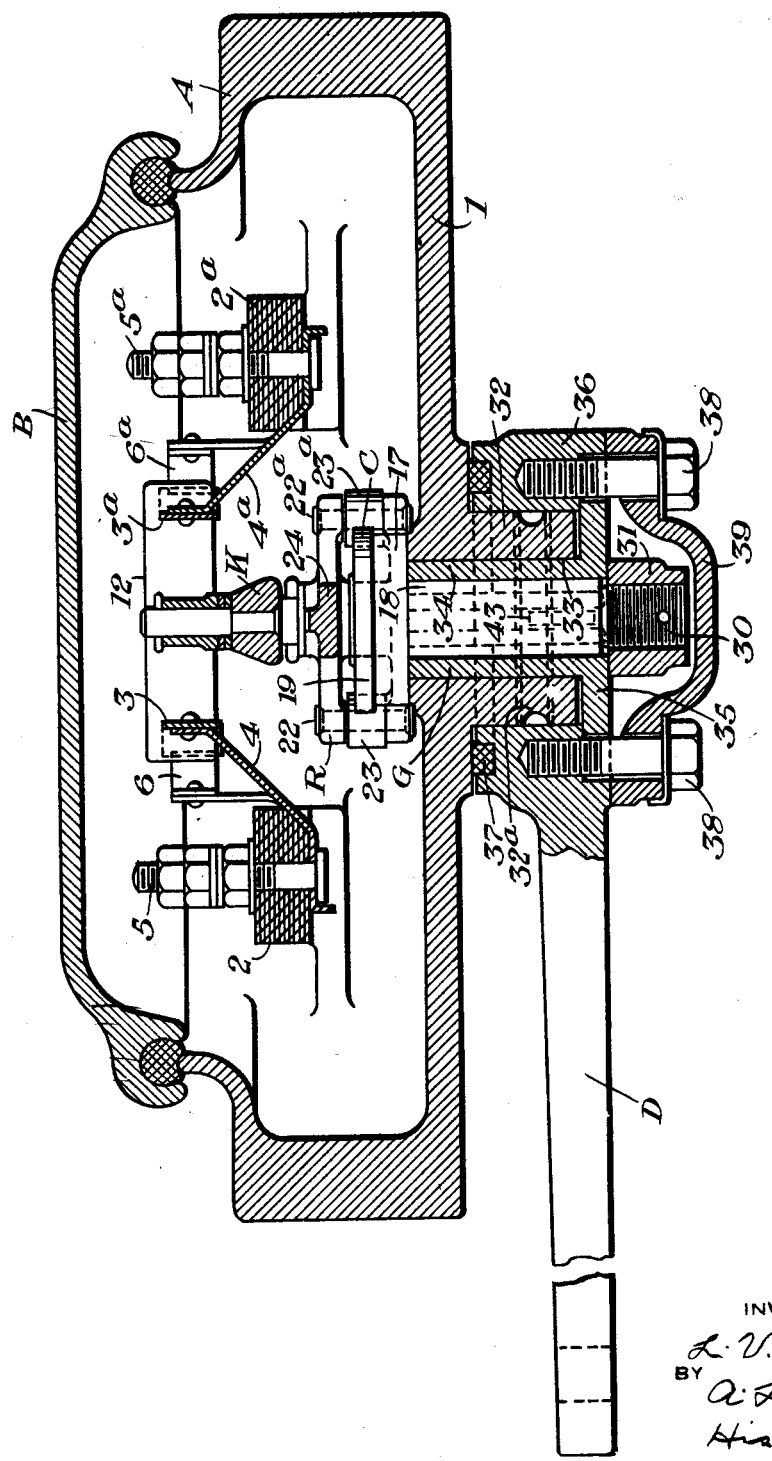

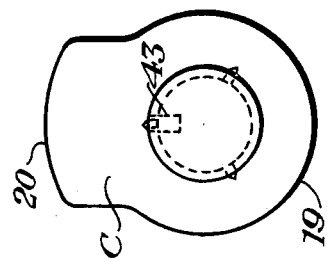
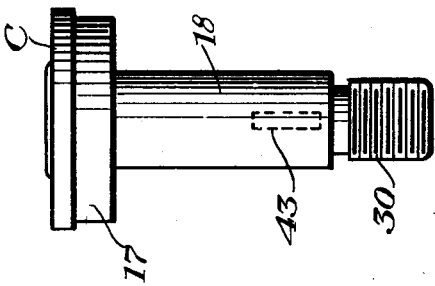
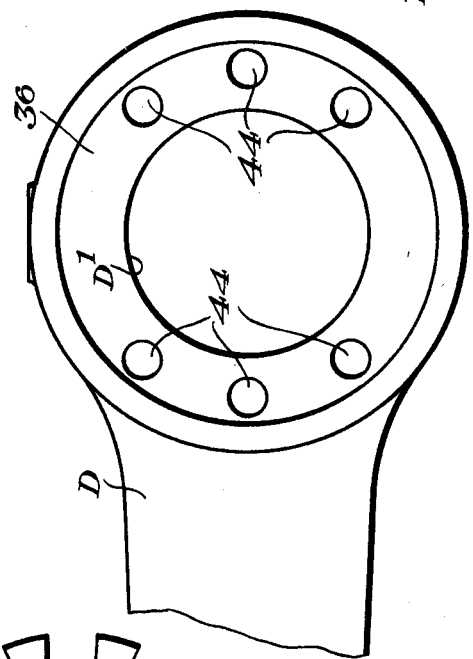
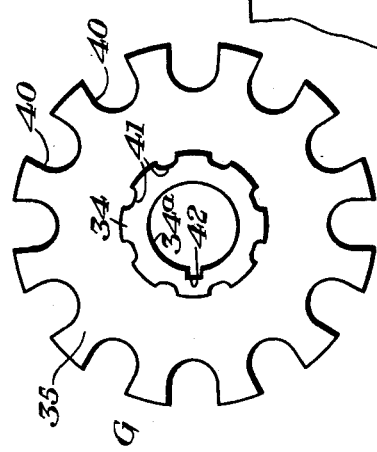
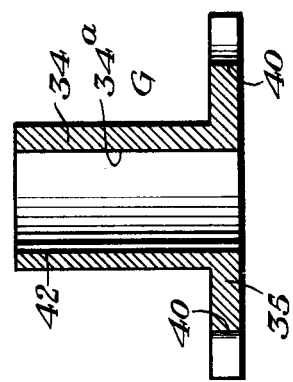

L. V. LEWIS

ELECTRICAL CIRCUIT CONTROLLER

Filed Aug. 20, 1925

1,674,783

5 Sheets-Sheet 5

INVENTOR:
L. V. Lewis,
BY A. L. Vencill
His ATTORNEY

Patented June 26, 1928.

1,674,783

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL CIRCUIT CONTROLLER.

Application filed August 20, 1925. Serial No. 51,517.

My invention relates to electrical circuit controllers.

I will describe one form of electrical circuit controller embodying my invention, and will then point out the novel features thereof in claims.

Figure 11:
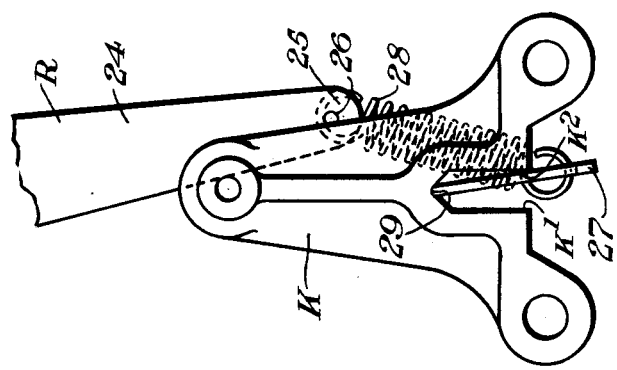
Figure 10:
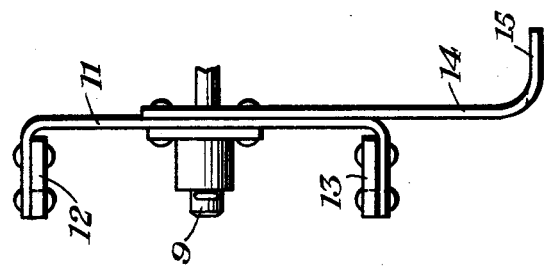
Figure 9:
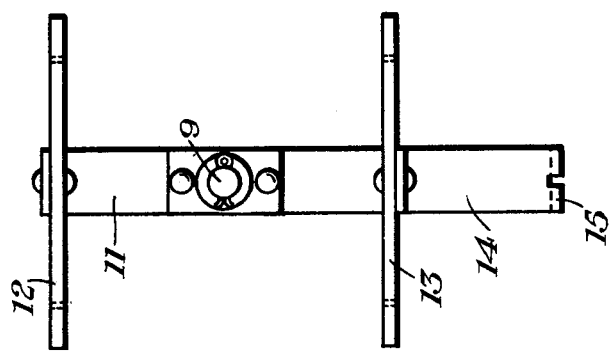

In the accompanying drawings, Fig. 1 is a top plan view of one form of circuit controller embodying my invention. Fig. 2 is a sectional view along the line II—II of Fig. 1. Fig. 3 is a vertical longitudinal section along the line III—III of Fig. 2. Figs. 4 and 5 are detail views illustrating in top plan and in vertical section, respectively, the bushing G of the circuit controller shown in the preceding views. Fig. 6 is a fragmental view illustrating a portion of the crank D. Figs. 7 and 8 are a top plan view and a front elevation, respectively, of the cam C and the cam shaft 18. Fig. 9 is a top plan view of the driver structure for operating the contact mechanism. Fig. 10 is an end view of the driver structure shown in Fig. 9. Fig. 11 is a view, showing in top plan, a portion of the circuit controller with the parts in the positions which they occupy when the rocker arm R is swung to its right-hand position.

Similar reference characters refer to similar parts in each of the several views.

Referring first to Figs. 1, 2 and 3, the circuit controller comprises a housing A and a cover B. The bottom plate 1 of the housing A carries a boss 32 containing a hole 33 which communicates with the interior of the housing. A bushing G (see also Figs. 4 and 5) comprises a barrel 34, journalled in the hole 33, and a flange 35. The bushing G is bored at 34$^a$ (Fig. 5) to receive the shaft 18 of the cam C. The upper end of this shaft 18, as seen in Fig. 3, is provided with a shoulder 17 which abuts the inner surface of the bottom plate 1 of the circuit controller housing. The opposite end of the cam shaft 18 is threaded at 30 to receive a castle nut 31 by means of which the cam shaft is rigidly attached to the bushing G. A key 43 in shaft 18 enters a keyway 42 in bushing G to lock the shaft to the bushing.

The crank D is bored at D' (Fig. 6) to receive boss 32, and is held against the outside face of the plate 1 by the flange 35 of bushing G. A packing ring 37 is placed between the head of the crank D and the face of plate 1 to protect the bearing surfaces from the elements. As best shown in Fig. 6 the head 36 of the crank D is provided with a plurality of spaced threaded holes 44. A cover 39 is attached to the head 36 by two screws 38 which pass through two diametrically opposite holes in cover 39 and may be threaded into any pair of the holes 44.

The screws 38 perform the function of providing an adjustable driving connection between crank D and cam shaft 18. As shown in Fig. 4 the flange 35 of the bushing G is provided at its edge with a plurality of spaced notches 40. The shoulder 35, as has already been seen, extends over the edge of the head 36 of the crank D. The notches 40 are so proportioned and the parts are so arranged that the screws 38 enter the notches 40. It will therefore be seen that when crank D is swung about the bearing 32, the bushing G, and therefore the shaft 18, are rotated about their axes. The screws 38 may be inserted in any of the holes 44 and in any of the notches 40 so that the position of the bushing G, and hence the position of the cam C, with respect to the crank D may be varied. To accomplish this adjustment the screws 38 are withdrawn, and the crank D and the bushing G are then adjusted to the proper relative positions. The screws 38 are then replaced in whichever pair of holes 44 happen to register with the notches 40. The angular spacing of the holes 44 in the crank D is different from the angular spacing of notches 40 in bushing G. As here shown the holes 44 are 40 degrees apart and the notches 40 are 30 degrees apart, and it therefore follows that adjustment in steps of 10 degrees may be conveniently and accurately made in the relative position of the crank D and the cam shaft 18.

The crank bearing is supplied with lubricant from a grease cup D$^2$ screwed into the head 36. This lubricant is distributed to the moving surfaces by an annular groove 32$^a$ in bearing shoulder 32 and by flutes 41 in the barrel 34 of bushing G.

Rigidly attached to the end of the cam shaft 18 is the cam C. This cam comprises a flat disk having a substantially circular cam surface 19 provided with a cam swell 20, as shown in Fig. 7.

Projecting inwardly from the bottom plate 1 of the circuit controller is a bearing post 16 best illustrated in Fig. 2. A rocker R is mounted to oscillate on this post and carries two rollers 23 and 23ª which are pivotally supported in spaced relation by pins 22 and 22ª carried by the rocker. The parts are so proportioned that when one of the rollers 23 or 23ª engages the cam surface 19 of cam C the other roller engages the swell 20. With the parts in the positions illustrated in the drawing the cam C is in its central position. If the cam C is turned in a clockwise direction as viewed in Fig. 1, the roller 23ª rides up on the swell 20 and roller 23 drops down on to the cam surface 19. The rocker R is therefore swung to the right about the post 16. If, on the other hand, the cam C is swung in a counter clockwise direction as viewed in Fig. 1 from the position in which it is illustrated in the drawing, the roller 23 engages the swell 20 and the roller 23ª engages the cam surface 19. The rocker R is then swung to the left about the post 16. The rocker R comprises an arm 24 having a bifurcated tip 25 arranged to receive the end of a coil spring 28 which is retained in the tip 25 by a pin 26. The other end of the spring 28 is attached to the center of a U-shaped yoke 27 (see also Fig. 11). A bracket K attached by screws 10 to the housing A, is provided with two bearing notches 29, as best shown in Fig. 2, to receive the ends of the legs of the yoke 27. The parts are so arranged that the bearing notches 29 for the yoke 27 are between the points of connection of the ends of spring 28. The rocker arm 24, spring 28, and the yoke 27 therefore comprise a toggle. As the rocker arm 24 is moved, for example from right to left (Fig. 11), yoke 27 will remain in its right hand position until arm 24 has passed slightly beyond mid stroke to a position where both ends of spring 28 and yoke 27 are in the same straight line. This is a position of unstable equilibrium, and a slight additional movement of rocker arm 24 will cause the yoke 27 to snap quickly from its right hand normal position against stop K² to its left hand normal position against stop K¹, thereby securing a quick reversal of the contacts and insuring that yoke 27 will be against either stop K¹ or K² for all positions of arm 24.

The bracket K carries a spindle 9 upon which is pivoted a U-shaped driving member 11 provided with an extension 14 having a forked end 15 arranged to engage the yoke 27. As the yoke 27 is reversed, driving member 11 therefore correspondingly oscillates about the spindle 9. Attached to the upright ends of driving member 11 are two insulating bars 12 and 13 which bars are arranged to control a contact mechanism which I will now describe.

Fastened in spaced relation on the inside of the housing A are two insulating strips 2 and 2ª. Referring particularly to strip 2, this strip carries at its center a bracket 4 to which is attached a flexible contact finger 3. The strip 2 also carries two fixed contact members 6 and 7 disposed adjacent the two ends respectively of the flexible contact finger 3. Binding posts 5 supported by the strip 2 may be used to connect the finger 3 and the fixed contact members 6 and 7 with an exterior circuit. In similar manner the strip 2ª carries a bracket 4ª to which a flexible contact finger 3ª is attached adjacent its center. Fixed contact members 6ª and 7ª are arranged adjacent the two ends of the finger 3ª. Insulating bars 12 and 13 attached to the driving member 11 are provided as shown in Figs. 3 and 9, with slots which receive the two contact fingers 3 and 3ª at points adjacent the fixed contact members 6 and 6ª.

With the parts in the positions illustrated in Fig. 1, the cam C is in an intermediate position so that the rocker R is also in an intermediate position. The yoke 27 and member 11 are also for simplicity shown in the central position in Fig. 1, but as a matter of fact yoke 27 will always occupy one extreme position or the other as controlled by spring 28, so that finger 3 will be at all times in contact with either member 6 or member 7, except for the instant of reversal, while finger 3ª will similarly be in contact with member 7ª or with member 6ª. To describe the operation, I will assume that the crank D is swung upwardly from the position shown in Fig. 1. The cam C is therefore moved in a clockwise direction so that rocker arm 24 of rocker R swings to the right. The yoke 27 will therefore also swing to the right so that the lower end of driving member 11 swings to the right, opening contacts 3—7 and 3ª—6ª and closing contacts 3—6 and 3ª—7ª. If, now, crank D is moved downwardly as viewed in Fig. 1, the cam C will move in a counter clockwise direction. This motion however will have no effect upon the operation of the circuit controller until the swell 20 of the cam engages the roller 23. When this happens the rocker R will be swung around the post 16 as a pivot so that the rocker arm 24 will be swung to the left. This motion of the arm will have no effect upon the position of the yoke 27 until the parts are in such position that the pin 26 in arm 24 is in the plane of the yoke 27. The yoke 27 will now be in unstable equilibrium and a slight further motion of the arm 24 as the cam C continues to rotate will cause the yoke 27 to snap over to its left hand position, carrying with it driving member 11ᵇ which now closes contacts 3—7 and 3ª—6ª, and opens contacts 3—6 and 3ª—7ª. As the motion of the crank D continues, no further change takes place in the position of any of the other parts of the circuit controller because rocker R, having once been swung to the extreme position, no further motion of the crank D alters the position of this arm, the rollers 23 and 23ª moving along the surface of cam C without altering the position of the rocker R.

One feature of my invention is that when the yoke 27 is in one extreme position the rocker arm 24 must be moved past its central position to a position wherein the tip of this arm is in the plane of the yoke before the toggle will operate to snap the yoke to its other extreme position and operate the contact mechanism, so that crank D may be moved from either extreme position to mid position, and slightly beyond the mid position without reversing the contacts, but must be moved a predetermined distance beyond the mid position in order to reverse the contacts.

Another feature of my invention is that due to the novel construction of the crank bearing, all strains and thrusts due to vibrations or stress upon the crank are absorbed by the bearing shoulder 32 and are not transmitted to the cam C or the cam shaft 18.

Although I have herein shown and described only one form of electrical circuit controller embodying my invention, it is understood that various changes and modifications may be made therein within the scope of the appended claims without departing from the spirit and scope of my invention.

Having thus described my invention, what I claim is:

1. A circuit controller comprising a flexible contact finger supported adjacent its center, two fixed contact members one adjacent each end of said finger, a toggle, and means controlled by said toggle for swinging one end or the other of said finger into engagement with the associated fixed contact member.

2. A circuit controller comprising a flexible contact finger supported adjacent its center, two fixed contact members one adjacent each end of said finger, a pivoted supported element, two fixed insulating bars carried by said element and operatively connected with said finger one adjacent each end thereof, and a toggle for swinging said element about its pivot whereby one end or the other of said finger engages the associated fixed contact member.

3. A circuit controller comprising a fixed post, a rocker arm pivoted on said post, a flat yoke, a spring having one end attached to the tip of said rocker arm and the other end attached to said yoke, a fixed bracket having bearing notches intermediate the ends of said spring for supporting said yoke, a rotatable cam for moving the tip of said arm to one side or the other of the yoke, and a contact mechanism controlled by said yoke.

In testimony whereof I affix my signature.

LLOYD V. LEWIS.